(No Model.)

J. H. JOHNSON.
SEED DRILL.

No. 369,859. Patented Sept. 13, 1887.

Witnesses
T. W. Fowler
W. H. Patterson

Inventor
John H. Johnson
By his Attorneys
Dewey & Co.

UNITED STATES PATENT OFFICE.

JOHN H. JOHNSON, OF TRAVER, CALIFORNIA.

SEED-DRILL.

SPECIFICATION forming part of Letters Patent No. 369,859, dated September 13, 1887.

Application filed April 7, 1887. Serial No. 234,089. (No model.)

*To all whom it may concern:*

Be it known that I, JOHN H. JOHNSON, of Traver, Tulare county, State of California, have invented an Improvement in Seed-Drills; and I hereby declare the following to be a full, clear, and exact description of the same.

My invention relates to that class of seed-drills in which rotating disks or cutters travel in front of the drills and form the furrows into which the drills discharge.

My invention consists in an improvement in the hanging of the rotary disks and the seed conveyers or drills from the wheeled frame, whereby each drill and disk is permitted to have an independent movement to accommodate itself to the inequalities of the ground.

It consists, also, in the means by which all the disks are depressed for the purpose of making them run deeper, or applying pressure to them when traveling over hard ground, and by which they are elevated when necessary, all of which, together with details of construction, I shall hereinafter fully describe.

The object of my invention is to provide a seed-drill of this class in which the operating parts may adjust themselves independently to the various inequalities of the surface over which they travel, and may have pressure applied to them, so as to cause them to run deeper or to cut suitably in harder ground, and in which the entire series may be raised from the ground when necessary.

Figure 1:
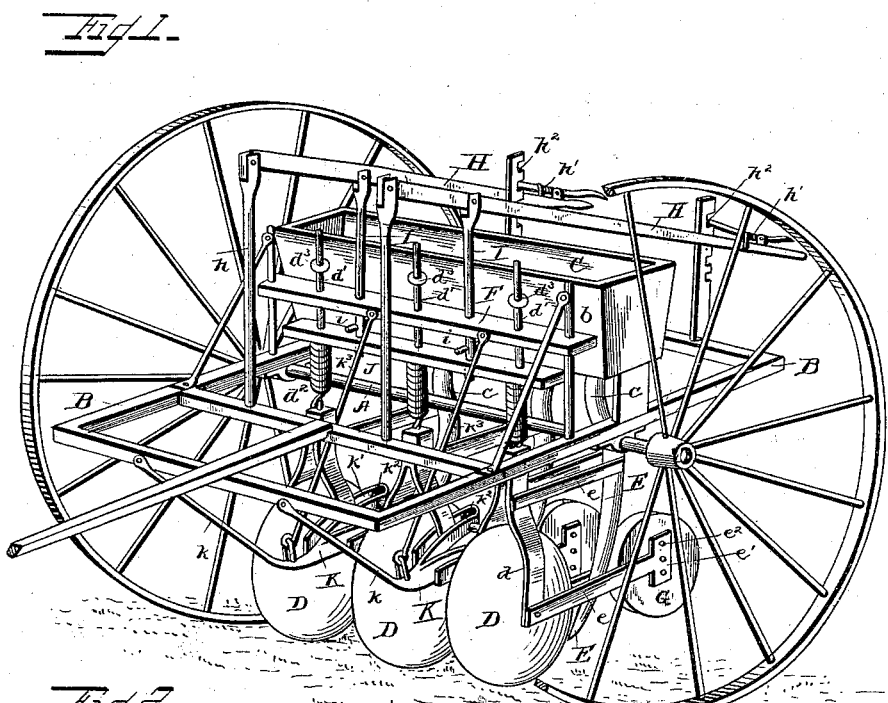
Figure 2:
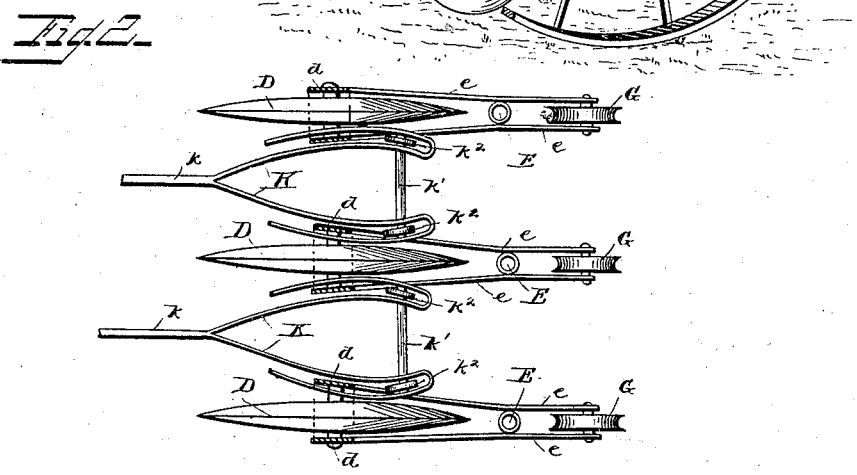

Referring to the accompanying drawings for a more complete explanation of my invention, Figure 1 is a perspective view of my seed-drill. Fig. 2 is a plan of the cutting-disks, seed-conveyers, covering-rollers, and connections.

A is the wheeled axle which supports the frame B, upon which is carried the seed-box C, which contains suitable mechanism for discharging the seed, operated by means of power derived from the wheels. This mechanism I have not deemed it necessary herein to show, as it forms no part of my invention, and it is sufficient, therefore, to merely refer to its presence for the purpose of indicating a complete mechanism.

D are the rotating cutting-disks by which the furrows are made, and E are the seed conveyers or drills which follow said disks, and are connected with the seed-box by the flexible tubes $c$ in the usual manner. Each of these disks is mounted in a forked bearing, $d$, from which a spindle or stem, $d'$, extends upwardly through a cross-head, F, which is mounted and adapted to move vertically upon standards $b$, rising from the sides of the frame and suitably braced. Each drill E is connected with the forked bearing $d$ of the disk by means of arms $e$, the lower ones of which are extended backwardly and are provided with bearings $e'$, in which are mounted the concave-faced covering wheels or rollers G, which said wheels or rollers may be vertically adjusted by journaling them in any of the vertical series of holes $e^2$ made in the bearings in which they are mounted.

The cutting-disks, the drills, and the covering wheels or rollers are all in line.

Rising from the frame B are standards $h$, to which are pivoted the operating-levers H, the rear ends of which are provided with spring-actuated pawls $h'$, which engage racks $h^2$, rising from the rear end of the frame B. To these levers, just forward of the seed-boxes, are pivoted the rods I, which pass down loosely through the cross-head F and through a second cross-head, J, which is mounted loosely on the spindles $d'$ of the disk-bearings $d$, said rods being provided with cross pins or bolts $i$, lying between the two cross-heads, and adapted to come in contact with each when moved up and down. Springs $d^2$ encircle the spindles $d'$, and are confined between the tops of the bearings $d$ and the lower cross-head, J. The tops of the spindles are provided with collars or stops $d^3$ above the upper cross-head, F.

K are slotted guides which embrace the arms of the forked bearings $d$ and confine said bearings, and in connection with the links $k$, which connect them with the frame B in front, act as drags for the disks. The rear ends of these guides are connected by short shafts $k'$, which carry anti-friction rollers $k^2$, against which the arms of the bearings $d$ bear when said bearings have a tendency to move back. The guides K are also connected with the upper cross-head, F, by rods $k^3$.

The operation of my seed-drill is as follows: The machine is drawn along, whereby the disks D make parallel furrows, into which the seed, which is passed from the box C through the tubes c into the drills E, is delivered, while the following concave-faced rollers G cover the furrows again and the seed therein, said rollers being, by reason of their concaved faces, particularly adapted to this end as being the reverse of the sharp rim-disks D, which make the furrows, said disks spreading the earth while the concave-faced rollers throw it inwardly. While the machine is traveling along, ordinarily each cutter-disk is independent, and when one comes to a raised place, or one in which it cannot make a furrow, it will yield by moving upwardly against its spring above, the guide K and roller $k^2$ therein preventing it from moving back, but holding it straight, so that in moving up its stem will not cramp. As soon as it has passed this point, the spring $d^2$ throws it down again to position. When a patch of hard ground is met with, and it be desired to apply pressure to the cutter-disks to cause them to make proper furrows, the driver presses down upon the levers H, thus forcing down their rods I, the cross-pins $i$ of which, coming in contact with the lower cross-head, J, force said cross-head down against the springs $d^2$, which, bearing downwardly, apply the pressure to the disks. When he wishes to raise the parts from the ground, he raises the levers so that, their rods rising, their pins $i$ come in contact with the upper cross-head, F, which, moving upwardly, comes in contact with the stops or collars $d^3$ on the spindles $d'$, thus raising the cutter-disks and their connecting parts.

Having thus described my invention, what I claim as new, and desire to secure by Letters Patent, is—

1. In a seed-drill, the wheeled frame carrying the seed-box, and having standards rising from its sides and a cross-head mounted on said standards, in combination with rotary cutter-disks with attached seed conveyers or drills and spindles or stems rising from the bearing in which each disk is mounted through the cross-head, and springs for returning the disks, whereby each disk and attached drill may have a vertical adjustment independent of the others, substantially as herein described.

2. In a seed-drill, a wheeled frame and a seed-box carried thereby, standards rising from the frame, and a cross-head mounted and sliding on said standards, in combination with rotary cutter-disks carrying seed conveyers or drills behind them, bearings in which said cutter-disks are mounted, having spindles passing upwardly through the cross-head and provided with fixed stops above it, pivoted levers on the frame, and rods secured to said levers, passing downwardly through the cross-head and provided with cross-pins under it, whereby said cross-head may be raised and the cutter-disks and attached parts elevated, substantially as herein described.

3. In a seed-drill, a wheeled frame and a seed-box carried thereby, in combination with rotary cutter-disks with attached seed conveyers or drills, bearings in which the disks are mounted, having upwardly-guided spindles, a cross-head secured to said spindles, and levers pivoted to the frame, having downwardly-extending rods with cross-pins bearing on the cross-head, whereby said head may be forced down and the disks depressed, substantially as herein described.

4. In a seed-drill, a wheeled frame and a seed-box carried thereby, standards rising from the frame, and a cross-head mounted and sliding upon said standards, in combination with rotary cutter-disks carrying seed conveyers or drills behind them, bearings in which said cutter-disks are mounted, having spindles passing upwardly through the cross-head and provided with fixed stops above it, a second cross-head secured to said spindles, pivoted levers on the frame, and rods secured to said levers, passing downwardly through the two cross-heads, and provided with cross-pins between them, whereby the cutter-disks and attached parts may be raised and lowered, substantially as herein described.

5. In a seed-drill, a wheeled frame having a seed-box and vertical standards, and a cross-head mounted on said standards and adapted to be vertically moved thereon, in combination with rotary cutter-disks carrying seed conveyers or drills behind them and in connection with the seed-box, bearings in which said disks are mounted, having spindles passing upwardly through the cross-head and provided with stops above it, a second cross-head mounted loosely on said spindles below, springs on said spindles below the cross-head and on which it bears, pivoted levers on the frame, and rods connected with said levers and passing loosely down through the cross-heads and provided with cross-pins between them, whereby the upper one is lifted by raising the levers, and the disks thereby raised, and the lower one is forced down by lowering the levers, and the disks thereby depressed, substantially as herein described.

6. In a seed-drill, the vertically-adjustable cutter-disks and attached seed conveyers or drills, and forked bearings in which the disks are mounted, in combination with the slotted guides embracing the arms of the bearings, and having the anti-friction rollers in their rear ends, and the links connecting the bearings with the main frame of the machine and forming drags, substantially as herein described.

7. In a seed-drill, the wheeled frame carrying a seed-box and standards, in combination with a vertically-moving cross-head on said standards, rotary cutter-disks with connected seed conveyers or drills and mounted in bearings having spindles passing up through said cross head and provided with stops above it, springs for holding said disks down, a lower cross-head loosely mounted on the spindles, levers with rods provided with cross-pins operating between the two cross-heads for elevating and depressing the disks, slotted guides for holding the bearings of the disks, links connecting said guides with the main frame and forming drags, and rods connecting them with the vertically-moving cross-head, all arranged and adapted to operate substantially as herein described.

In witness whereof I have hereunto set my hand.

JOHN H. JOHNSON.

Witnesses:
J. S. JONES,
E. M. COCKERLINE.